Feb. 11, 1941.    J. L. GISRIEL    2,231,185
STRAW CUTTER ATTACHMENT FOS HARVESTERS
Filed Jan. 27, 1940    2 Sheets-Sheet 1
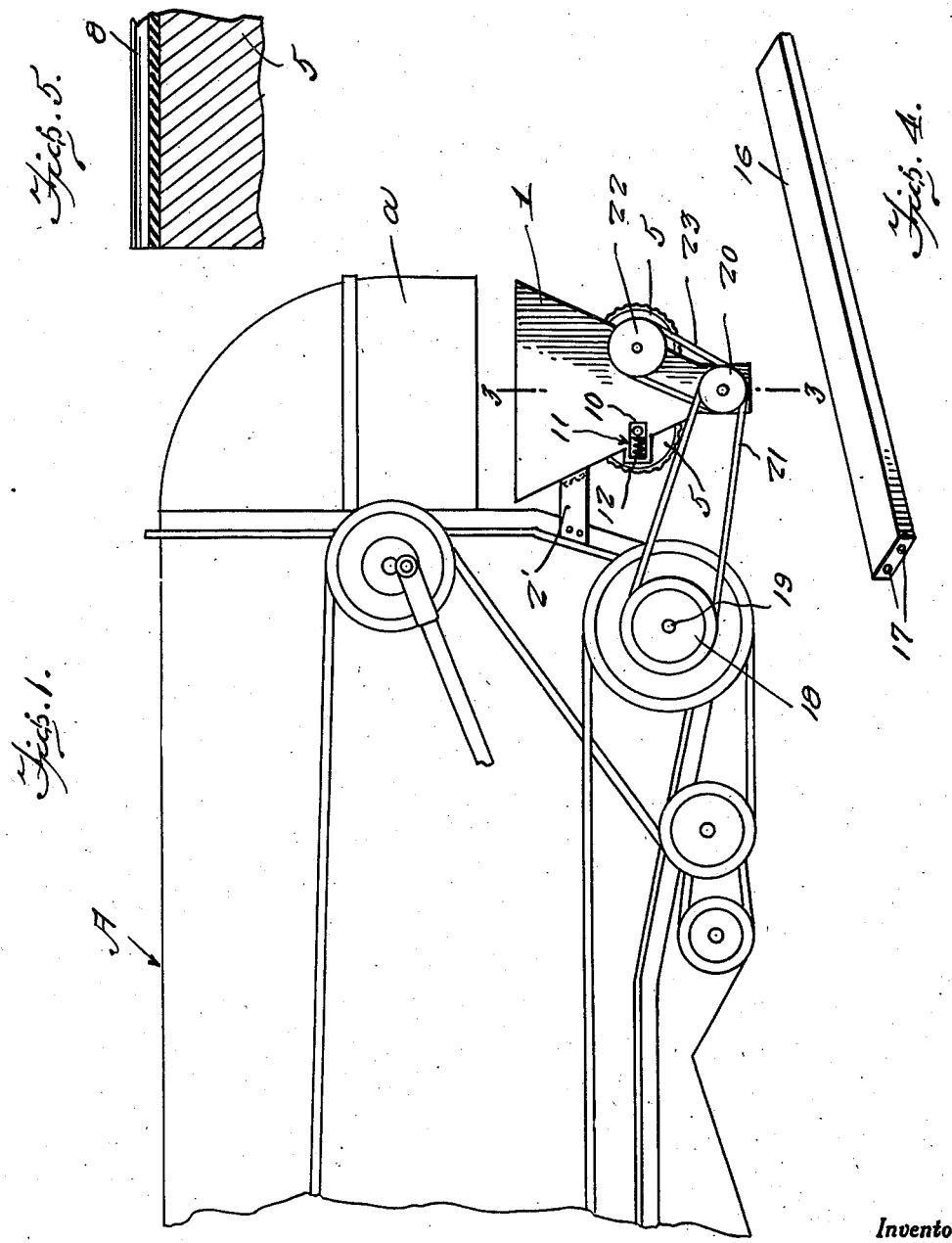
Inventor
Joshua Levering Gisriel
By Clarence A. O'Brien
and Hyman Berman
Attorneys

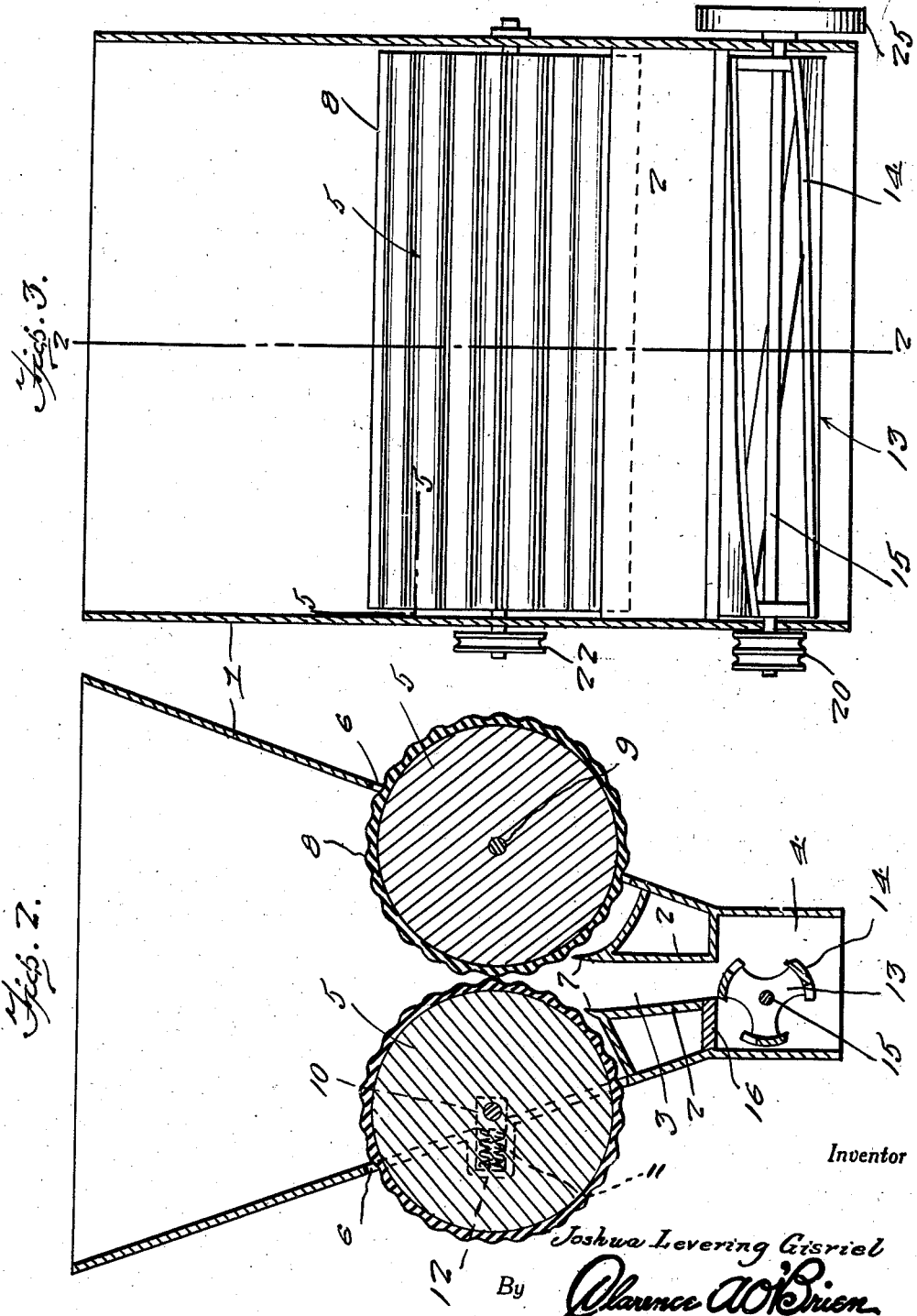

Patented Feb. 11, 1941

2,231,185

UNITED STATES PATENT OFFICE 2,231,185

STRAW CUTTER ATTACHMENT FOR HARVESTERS

Joshua Levering Gisriel, Shickshinny, Pa.

Application January 27, 1940, Serial No. 316,025

1 Claim. (Cl. 146—123)

This invention relates to a straw cutter attachment for combines, the general object of the invention being to provide means driven from the combine for cutting the straw into short lengths as it is discharged from the machine so that the straw will not injure young grass growing in the stubble nor interfere with use of a spring tooth harrow or the like where such stubble is to be subsequently prepared by harrowing.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a fragmentary elevational view showing the invention in use on a combine.

Figure 2 is a section on the line 2—2 of Figure 3.

Figure 3 is a section on the line 3—3 of Figure 1.

Figure 4 is a view of the stationary knife member.

Figure 5 is a section on the line 5—5 of one of the rolls.

In these views the letter A indicates a portion of a combine which is provided with a straw discharge part $a$ at its rear end which discharges the straw upon the ground and in carrying out my invention I provide a hopper 1 which is supported under the discharge part $a$ and in spaced relation thereto by the bracket means 2' attached to the frame of the combine. This hopper receives the straw coming from the part $a$ and a pair of hollow members 2 are located in the lower part of the hopper to provide a narrow throat or outlet 3 for the hopper, this throat discharging into a chamber 4 formed in the lower end of the hopper and having its bottom open. A pair of large rolls 5 is rotatably supported by the hopper and pass through openings 6 in the front and rear sides of the hopper above the throat and the members 2 are slightly curved at their upper ends and conform with the curvature of these rolls and each member 2 is formed with an upwardly projecting lip 7 coming close to a part of each roll and acting to prevent straw from being carried over the top of each member 2 by a roll. Each roller is provided with a rubber cover 8 which is corrugated as shown and each roller is supported on a shaft 9 journaled in side parts of the hopper and the shaft of one of the rolls is carried by the blocks 10 supported for limited sliding movement in the boxes 11 carried by the hopper with the blocks being engaged by the springs 12 which act to press the blocks toward the other roller thus yieldingly holding one roller against or adjacent the other roller so that when thick bunches of straw start to pass through the rolls one roll can move away from the other to permit the straw to pass by into the throat. A reel 13 carrying the knives 14 is fastened to a shaft 15 rotatably supported in the ends of the chamber forming part 4 and the bottom of the member 2 above the reel is formed of a stationary knife bar 16 which cooperates with the spiral blades 14 of the reel for chopping the straw coming from the throat into small lengths. This stationary knife 16 is shown in Figure 4 and it is formed with holes 17 in its ends for receiving fastening means which support the stationary knife from end walls of the hopper.

A pulley 18 is connected to a shaft 19 forming part of the combine and a double pulley 20 is fastened to one end of the shaft 15 of the cutter reel and a belt 21 passes over a part of this pulley 20 and over the pulley 18 so that the reel is driven from a movable part of the combine. A pulley 22 is connected with the shaft of the roll 5 which does not have sliding movement and a belt 23 passes over this pulley and the second part of the pulley 20 so that the rolls are driven from the pulley 20, it being understood that movement of one roll 5 will cause movement of the other roll 5.

Thus it will be seen that I have provided simple means for chopping straw coming from a combine so that the straw when delivered to the ground will be of short lengths so that it will not interfere with the harrowing of the ground and will not smother young grass growing in the stubble. The rubber covered rollers will feed the straw dropping into the hopper through the outlet or throat 3 where the straw will be engaged by the rotating knives of the reel so that the straw will be chopped into small lengths and then the chopped straw will drop from the chamber 4 upon the ground. A flywheel 25 is attached to one end of the cutter shaft.

While the device is referred to as an attachment it is to be understood that it may be built as an integral part of the combine and its use will prevent straw being raked up with the hay crop which follows the grain crop. This is a very important point as the sales of combines is being restricted in some sections by this complaint when clover or other hay following grain in the farm rotation, the uncut straw from the preceding years being raked up with the hay crop.

It is thought from the foregoing description that the advantages and novel features of the invention will be readily apparent.

It is to be understood that changes may be made in the construction and in the combination and arrangement in the several parts provided that such changes fall within the scope of the appended claim.

Having described the invention, what is claimed as new is:

A cutter device of the class described comprising a hopper having straight ends and downwardly and inwardly sloping side walls terminating in a short vertically arranged lower end, said short ends of the side walls and the lower ends of the end pieces forming a chamber the bottom of which is open, a pair of hollow members extending along the side walls at the lower ends of their sloping parts and spaced apart to form a passage or throat, each hollow member having a downwardly and outwardly sloping top part and an upwardly extending lip at the junction of its top part with its inner side part, one of the hollow members being open at its bottom, a knife forming plate closing said bottom and detachably fastened to the end pieces of the hopper, said plate and the bottom part of the other hollow member being located at the top of the chamber, slots in the sloping side walls of the hopper and extending transversely, feed rollers journaled in the hopper and having portions passing through said slots with the rollers substantially engaging each other at a point above the throat and said rollers having portions located adjacent the lips, said lips preventing the material fed downwardly by the feed rollers from passing between the rollers and the upper parts of the hollow members, a cutter reel in the chamber for cooperating with the knife plate for cutting the material passing from the throat and means for actuating the feed rollers and the cutter reel.

JOSHUA LEVERING GISRIEL.